(12) United States Patent
Akiya

(10) Patent No.: US 9,443,543 B1
(45) Date of Patent: Sep. 13, 2016

(54) DISK STORAGE DEVICE AND METHOD FOR CONTROLLING HEAD FLYING HEIGHT

(71) Applicant: Kabushiki Kaisha Toshiba, Minato-ku, Tokyo (JP)

(72) Inventor: Shinsuke Akiya, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/745,735

(22) Filed: Jun. 22, 2015

Related U.S. Application Data

(60) Provisional application No. 62/131,785, filed on Mar. 11, 2015.

(51) Int. Cl.
G11B 21/02 (2006.01)
G11B 27/36 (2006.01)
G11B 5/60 (2006.01)
G11B 5/596 (2006.01)
G11B 20/12 (2006.01)

(52) U.S. Cl.
CPC ......... *G11B 5/6076* (2013.01); *G11B 5/59638* (2013.01); *G11B 20/1252* (2013.01); *G11B 2020/1281* (2013.01)

(58) Field of Classification Search
None
See application file for complete search history.

(56) References Cited

U.S. PATENT DOCUMENTS

| 6,771,453 | B2* | 8/2004 | Baumgartner | G11B 5/5521 360/25 |
| 7,933,085 | B2* | 4/2011 | Baumgart | G11B 5/455 360/31 |
| 8,537,488 | B2* | 9/2013 | Kawamoto | G11B 5/6005 360/31 |
| 2003/0086197 | A1 | 5/2003 | Baumgartner et al. | |
| 2007/0201154 | A1 | 8/2007 | Ozeki | |
| 2013/0335842 | A1 | 12/2013 | Shibasaki | |

FOREIGN PATENT DOCUMENTS

| JP | 2001-291218 A | 10/2001 |
| JP | 2012-089219 A | 5/2012 |
| JP | 2014-002807 A | 1/2014 |

* cited by examiner

*Primary Examiner* — K. Wong
(74) *Attorney, Agent, or Firm* — White & Case LLP

(57) ABSTRACT

According to one embodiment, a head flying height control method includes detecting a contact of a head with a disk while floating the head from the disk and moving the head in a radial direction of the disk, increasing a flying height of the head after detecting the contact of the head with the disk, and decreasing the flying height of the head after a state where the contact of the head with the disk is not detected continues.

20 Claims, 6 Drawing Sheets

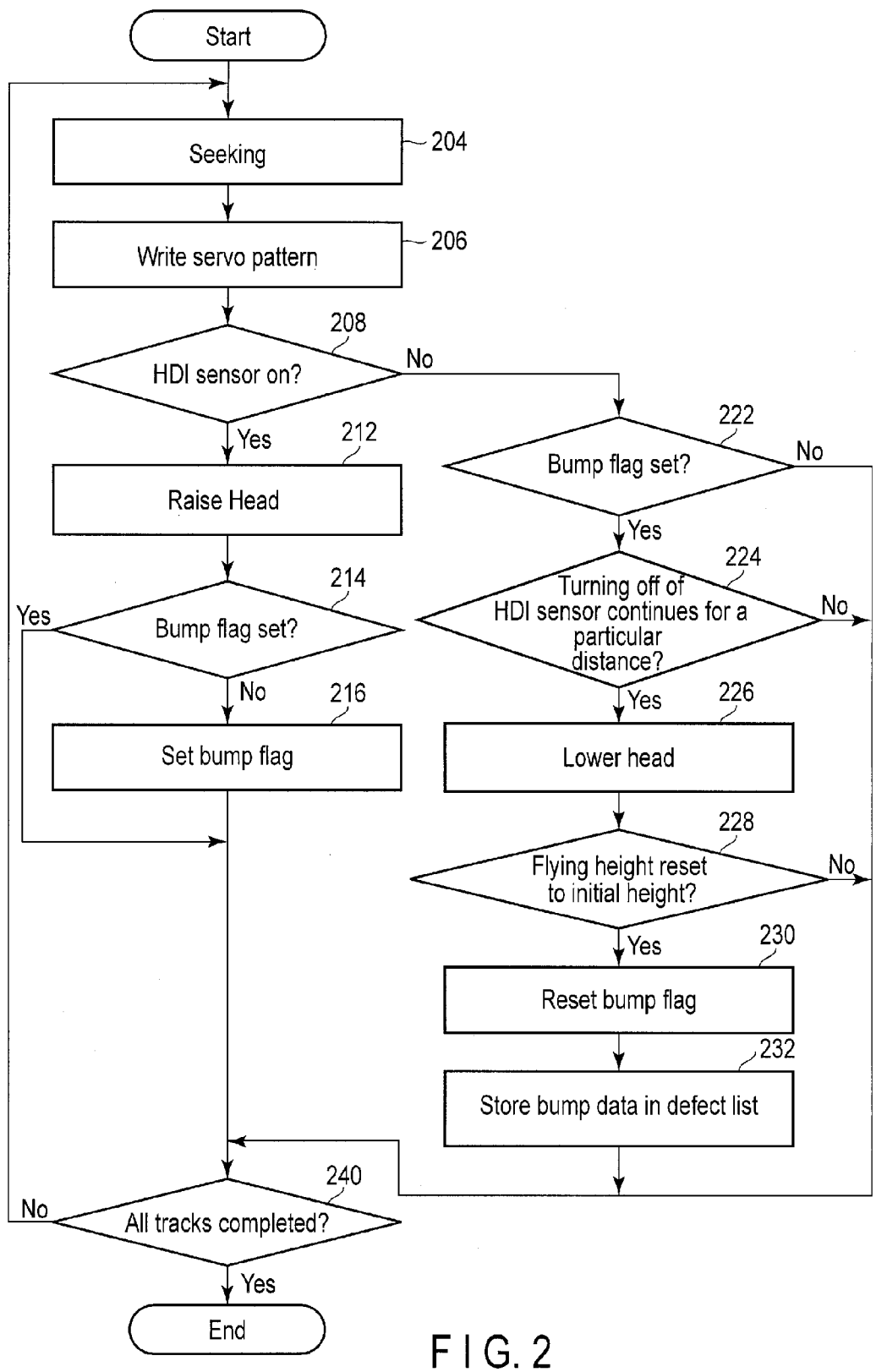
F I G. 2

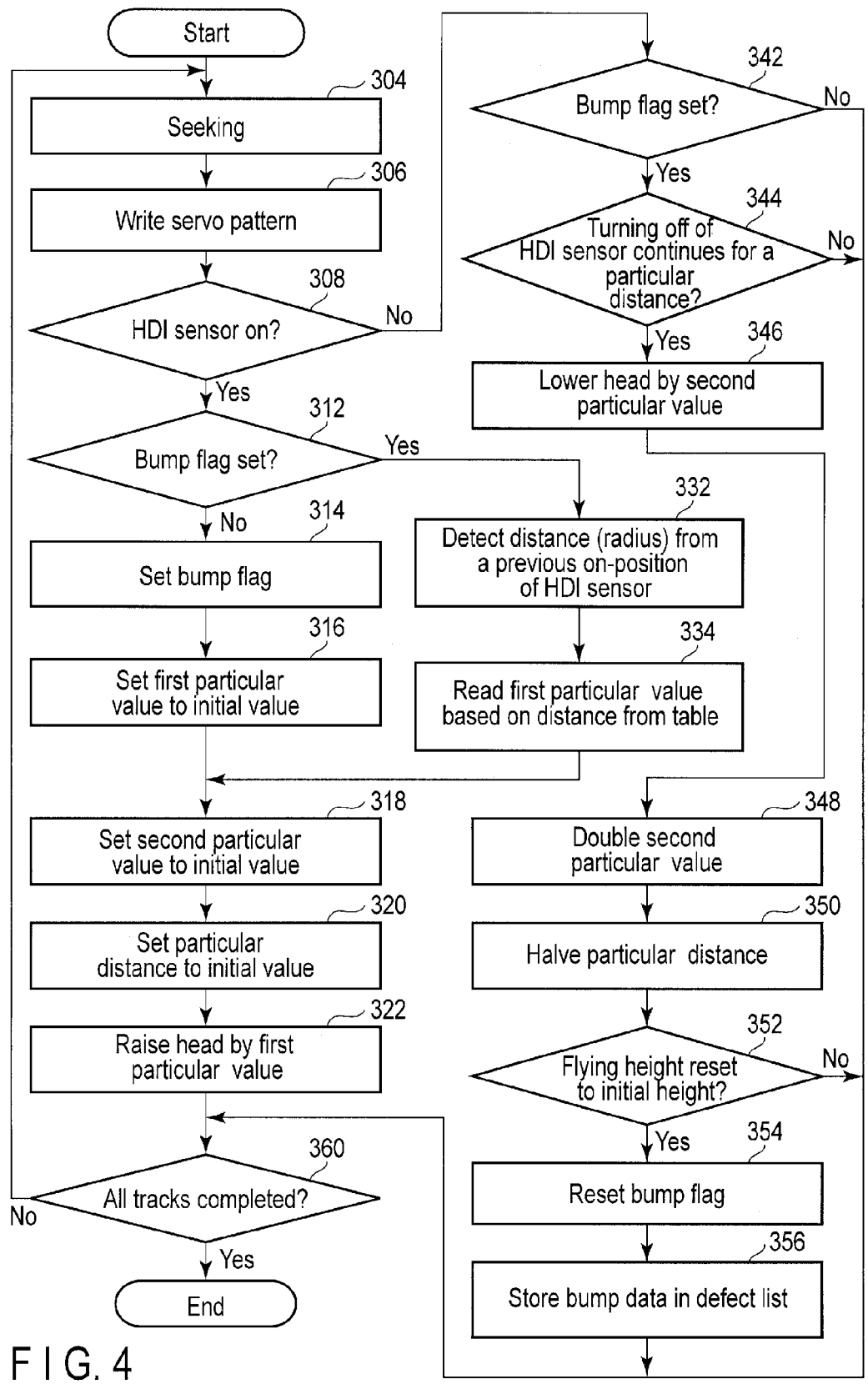
F I G. 4

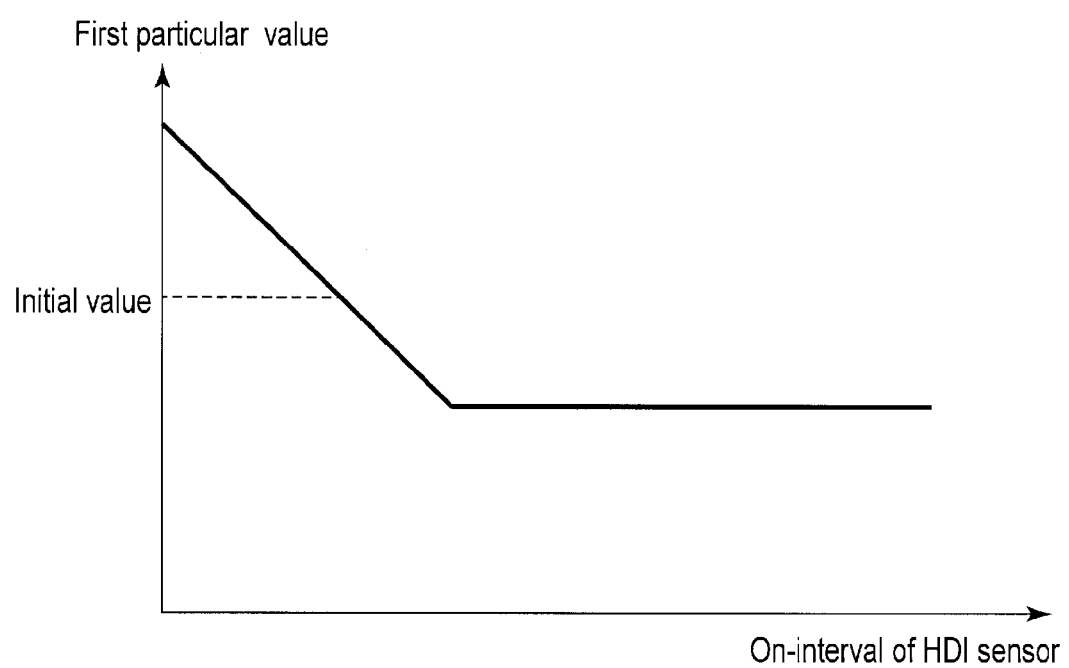
F I G. 5

DISK STORAGE DEVICE AND METHOD FOR CONTROLLING HEAD FLYING HEIGHT

CROSS-REFERENCE TO RELATED APPLICATIONS

This application claims the benefit of U.S. Provisional Application No. 62/131,785, filed Mar. 11, 2015, the entire contents of which are incorporated herein by reference.

FIELD

Embodiments described herein relate generally to a disk storage device and method for controlling a head flying height.

BACKGROUND

Hard disk devices are designed to read data from/to write data to a rapidly rotating magnetic disk with a head flying thereover. In a manufacturing process of the disk, a projection called a media bump (hereinafter simply referred to as a bump) is sometimes formed on the surface of the magnetic disk erroneously. The size of the bump is a few hundreds of nanometers to a few micrometers in width and a few tens of nanometers in height. If the height of the bump is greater than the flying height of the head, the head contacts the bump, leading to deterioration or destruction of the head. Furthermore, data cannot be recorded on the part of the disk where the bump is. To avoid these situations, magnetic disks are inspected before shipping in order to detect bumps on the disk and record the positions of the bumps, and the flying height is controlled to prevent the head from contacting the bumps on a user's device.

However, the flying height of the head used in the bump detection inspection may be fixed, and if there are relatively large bumps on the magnetic disk, the head contacts the bumps many times and deterioration or destruction of the head is inevitable. In consideration of this point, the flying height of the head may be set greater (that is, the head may be set higher) than that in an actual read/write operation. However, in this case, gap between the magnetic disk and the head increases, and accordingly, minute or low bumps cannot be detected and the accuracy of the detection cannot be sufficient.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a flowchart which shows an example of bump scanning.

FIG. 4 is a flowchart which shows another example of bump scanning.

FIG. 5 shows increment of the flying height in the other example of bump scanning.

DETAILED DESCRIPTION

Various embodiments will be described hereinafter with reference to the accompanying drawings.

In general, according to one embodiment, a head flying height control method includes detecting a contact of a head with a disk while floating the head from the disk and moving the head in the radial direction of the disk, increasing a flying height of the head after detecting the contact of the head with the disk, and decreasing the flying height of the head after a state where the contact of the head with the disk is not detected continues.

Figure 1:
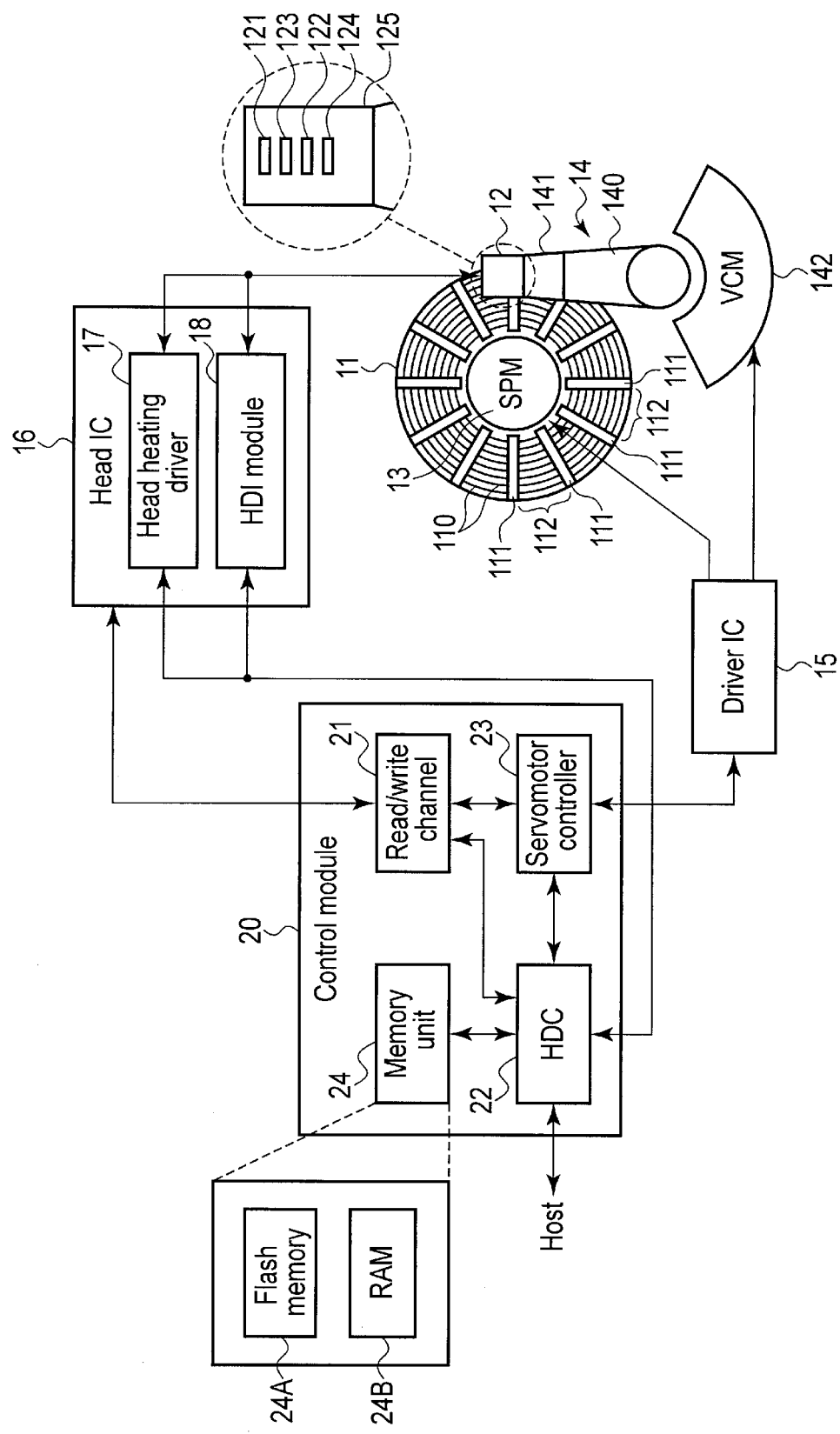
FIG. 1 is a block diagram which shows an example of structure of a magnetic disk device of an embodiment.

FIG. 1 is a block diagram which shows a typical structure of a magnetic disk device according to an embodiment. The magnetic disk device in FIG. 1 includes a disk (magnetic disk) 11, head (magnetic head) 12, spindle motor (SPM) 13, actuator 14, driver IC 15, head IC 16, and control module 20.

The disk 11 is a magnetic recording medium and has a recording surface on its one surface for magnetic recording of data. The disk 11 is rapidly rotated by the SPM 13. The SPM 13 is driven by current (or voltage) supplied by the driver IC 15.

The recording surface of the disk 11 includes a plurality of tracks 110 shaped as concentric circles, for example. Note that the disk 11 may include a track shaped as a spiral. The disk 11 includes a plurality of servo regions 111. The servo regions 111 are distributed in a radial direction and at regular intervals circumferentially on the disk 11. Each region defined by adjacent servo regions 111 included in the tracks 110 is used as a data region 112. The servo regions 111 in the tracks 110 112 may be referred to as a servo frame. Furthermore, a region including the servo region 111 and its adjacent data region 112 may be referred to as a servo sector. The data region 112 includes a plurality of data sectors.

A servo pattern is recorded in the servo region 111. The servo pattern includes a servo mark, address data, and burst data. The servo mark includes specific codes (pattern signals) used to identify the corresponding servo sector. The address data includes an address of the corresponding track 110 (that is, cylinder address) and an address of the corresponding servo sector (that is, servo sector address). The burst data includes data (so-called relative position data) used to detect a positional gap (positional error) between the head 12 and, for example, a center line of the corresponding track 110.

The head 12 is disposed to correspond to the recording surface of the disk 11. The head 12 includes a slider 125 attached to a suspension 141 extending from an arm 140 of the actuator 14. The actuator 14 includes a voice coil motor (VCM) 142 which drives the actuator 14. The VCM 142 is driven by current (or voltage) supplied by the driver IC 15. The drive of the actuator 14 by the VCM 142 moves the head 12 over the disk 11 drawing an arc in the radial direction of the disk 11.

In the structure of FIG. 1, the magnetic disk device includes a single disk 11. However, a plurality of disks 11 may be layered in the device. Furthermore, in the structure of FIG. 1, the recording surface is disposed on one surface of the disk 11. However, recording surfaces may be disposed on both the surfaces of the disk 11 and the heads 12 may be disposed to correspond to the recording surfaces, respectively.

The head 12 includes a write element 121, read element 122, head disk interface (HDI) sensor 123, and heater element 124 those are embedded in the slider 125. The write element 121 is used to write data to the disk 11, and the read element 122 is used to read data from the disk 11. The HDI sensor 123 and the heater element 124 are not necessarily be disposed to the exact positions shown in FIG. 1.

The HDI sensor 123 electrically detects an interference between the HDI sensor 123 (or the head 12 including the HDI sensor 123) and the disk 11, that is, an interaction therebetween. The interference may be a thermal interference, for example. The HDI sensor 123 is a contact detector including, for example, a magneto-resistive (MR) element which is not shown. The head disk interface is an event such as a contact or a collision of the head with a bump on the disk 11. The MR element is known as an element of which resistance to a temperature changes significantly. A temperature of the HDI sensor 123 changes corresponding to the size of the thermal interference (that is, thermal interaction) between the HDI sensor 123 and the disk 11. For example, when the head 12 contacts a bump, the HDI sensor 123 of the head 12 and the disk 11 generate heat and the temperature of the HDI sensor 123 changes by the heat. The resistance of the MR element of the HDI sensor 123 changes corresponding to a change in the temperature of the HDI sensor 123. That is, the resistance of the HDI sensor 123 represents the size of thermal interference between the HDI sensor 123 and the disk 11. The size of the thermal interference changes depending on a condition of the surface of the disk 11 facing the HDI sensor 123. That is, the resistance of the HDI sensor 123 changes depending on a condition of the surface of the disk 11 facing the HDI sensor 123. Therefore, the HDI sensor 123 can be used for detection of bumps on the disk 11.

The MR element of the HDI sensor 123 has a width in the radial direction of the disk 11 (hereinafter referred to as HDI sensor width) which is greater than that of the read element 122. That is, where a width of the read element 122 in the radial direction of the disk (hereinafter referred to as read element width) is given $W_{RE}$, and the HDI sensor width is given $W_{HDIS}$, they are represented as $W_{HDIS} > W_{RE}$. In the present embodiment, $W_{HDIS}$ is a dozen or so times $W_{RE}$. Note that FIG. 1 does not show a difference between the read element width $W_{RE}$ and the HDI sensor width $W_{HDIS}$ for the sake of simpler depiction.

The heater element 124 is a heater coil of the slider 125 and is used for control of the flying height of the head 12. The flying height is a gap between the surface of the disk 11 and the tip of the slider 125. That is, the flying height is a height from the surface of the disk 11 to the head 12 flying thereupon. The heater element 124 heats the tip of the slider 125 depending on the current (or voltage) supplied from a head heating driver 17 provided within the head IC 16. The tip of the slider 125 expands corresponding to the heat and the head 12 is lowered (the flying height decreases). In contrast, when the heat of the heater element 124 decreases, the tip of the slider 124 contracts and the head 12 is raised (the flying height increases). In the initial state, the head heating driver 17 supplies constant current (voltage) to the heater element 124 to set the flying height of the head 12 to an initial value. Then, the head heating driver 17 increases/decreases the current (or voltage) to be supplied to the heater element 124, the tip of the slider 125 is correspondingly changed to expand/contract, and the flying height of the head 12 increases/decreases.

The driver IC 15 drives the SPM 13 and VCM 142 controlled by a servo controller 23 inside the control module 20.

The head IC 16 may be referred to as a head amplifier, and amplifies signals read by the read element 122 of the head 12 (that is, it amplifies read signals). Furthermore, the head IC 16 converts the write data output from the control module 20 (more specifically, an R/W channel 21 inside the control module 20, which is described later) to write current and outputs the write current to the write element 121 of the head 12.

The head IC 16 includes an HDI module 18 in addition to the head heating driver 17. The HDI module 18 supplies particular bias current to the MR element of the HDI sensor 123 of the head 12 to detect a voltage (hereinafter referred to as HDI sensor voltage) between both ends of the MR element. The HDI sensor voltage changes depending on a change in the resistance of the MR element (that is, a change in a temperature of the MR element). Therefore, the HDI sensor voltage represents a size of the thermal interference between the HDI sensor 123 and the disk 11. When the head 12 contacts a bump, the HDI sensor voltage increases to draw a pulse-like waveform. The HDI sensor voltage is compared with a threshold value, and the HDI sensor 123 is determined to be on when the voltage is greater than or equal to the threshold value.

The control module 20 is realized by a system LSI in which a multiple components are integrated into a single chip. The control module 20 includes a read/write (R/W) channel 21, hard disk controller (HDC) 22, servo controller 23, and memory unit 24.

The R/W channel 21 processes the signals related to reading/writing with respect to the disk 11. For example, the R/W channel 21 converts the read signal amplified by the head IC 16 to digital data and decodes the digital data to output read data. The R/W channel 21 extracts a servo pattern from the digital data. The R/W channel 21 generates a servo sector timing signal based on the extracted servo pattern. The servo sector timing signal corresponds to a servo sector including the servo region 111 in which the extracted servo pattern (more specifically, the data region 112 in the servo sector including the servo region 111). The R/W channel 21 encodes write data transferred from the HDC 22 and transfers the encoded write data to the head IC 16.

The HDC 22 is connected to a host (host device) via a host interface (storage interface). The host uses the magnetic disk device shown in FIG. 1 as its storage device. The host and the magnetic disk device shown in FIG. 1 are equipped in electronic devices such as personal computer, video camera, music player, mobile terminal, mobile phone, and printer. The HDC 22 functions as a host interface controller which transfers signals to a host and receives signals transferred by the host. Specifically, the HDC 22 receives commands (write command, read command, and the like) transferred from the host. The HDC 22 controls the data transfer between the HDC 22 itself and the host. The HDC 22 also functions as a disk interface controller which controls data write to and read from the disk 11 via the R/W channel 21, head IC 16, and head 12. Furthermore, the HDC 22 performs bump scanning to detect bumps on the disk 11 and stores the positions of the bumps in, for example, a defect list format.

The servo controller 23 controls the SPM 13 and VCM 142 via the driver IC 15. The servo controller 23 controls the VCM 142 based on the servo pattern extracted by the R/W channel 21 to position the head 12 to a target position of a target track 110 on the disk 11. Here, controlling the VCM 142 is equivalent to controlling the actuator 14 including the VCM 142.

In the present embodiment, each of the HDC 22 and the servo controller 23 includes a micro processor unit (MPU). The MPU executes a control program for the HDC 22 and a control program for the servo controller 23 to function as the HDC 22 and the servo controller 23. The control programs are stored in a flash memory 24A described later. Note that a single MPU may execute these control programs in a time sharing manner.

The memory unit 24 includes the flash memory 24A and a RAM 24B. The flash memory 24A is a rewritable non-volatile memory. In a part of a memory area of the flash memory 24A, a control program (firmware) to realize the functions of the control module 20 including the HDC 22 and the servo controller 23 is previously stored. Another part of the memory area of the flash memory 24A is used to store results of bump detection in a defect list format. Still another part of the flash memory 24A is used to store bump regions which should be used for read/written processes. At least part of the memory area of the RAM 24B is used as a work area for the HDC 22 and the servo controller 23.

Next, bump scanning according to the embodiment is exemplified with reference to a flowchart of FIG. 2. Bump scanning of the disk 11 to detect bumps thereon and store positions of the bumps can be performed at any time before commercial distribution. In this embodiment, bump scanning is performed in a self servo writing process. Bump scanning of FIG. 2 is outlined in FIG. 3 which shows that, every time the head 12 contacts a bump and the HDI sensor 123 turns on, the head 12 is raised, and then the HDI sensor 123 turns off. Then, if the HDI sensor 123 is being continuously off while the head 12 travels a certain distance, the head 12 is lowered.

In block 204, seeking is performed. Based on an instruction from the HDC 22, the servo controller 23 drives the actuator 14 via the driver IC 15 so as to drive the head 12 to scan the entire recording surface of the disk 11 track by track of the tracks (cylinder) 110. The servo controller 23 first sets the head 12 to a position of a target track (which is initially the innermost radius track, for example). A flying height of the head 12 at that time is set to an initial flying height (height from the disk surface). The initial flying height is set to, for example, a few nm which is a possible value for a flying height at reading/writing by the head 12. Therefore, the head heating driver 17 supplies certain current (or voltage) to the heater element 124 to heat the slider 125 to a certain extent, and the head 12 is lowered to a few nm from the disk surface. In block 206, a servo pattern is written to a servo region 111 of the target track.

In block 208, it is determined whether or not the HDI sensor 123 is turned on, that is whether or not the head 12 contacts a bump. If the HDI sensor 123 is turned on, the head heating driver 17 decreases the current (or voltage) supplied to the heater element 124 by a certain amount in block 212. Consequently, the tip of the slider 125 contracts and the flying height of the head 12 increases by a certain amount (the head 12 is raised) to avoid a contact with a bump.

In block 214, it is determined whether or not a bump flag is set. In the embodiment, the bump flag is used not to detect a bump each time the HDI sensor 123 outputs a pulse-shaped HDI sensor voltage (the HDI sensor is tuned on) but to detect a bump during a period between the turning on of the HDI sensor 123 and satisfaction of a particular condition. That is, when the HDI sensor 123 turns on, the bump flag is set. When the particular condition is satisfied, the bump flag is reset. Thus, if it is determined in block 214 that the bump flag is not set (is reset), the bump flag is set in block 216. While the bump flag is set, the bump detection is in progress. Or, if it is determined in block 214 that the bump flag is set, block 216 is skipped.

In block 240, it is determined whether or not the bump scanning of all the tracks is completed. If it is not, seeking continues going back to block 204, the target track is shifted outward in the radial direction of the disk, and the above processing is repeated. The shift of the target track is in increments of a half of the servo track width, for example.

If it is determined in block 208 that the HDI sensor 123 is not on (is off), it is determined in block 222 whether or not the bump flag is set. If the bump flag is not set (is reset), it is determined in block 240 whether or not the bump scanning is completed. If the bump flag is set, it is determined in block 224 whether or not the HDI sensor 123 is continuously off while the head 12 travels in the radial direction of the disk 11 by a particular distance which is a threshold distance.

The state where the HDI sensor 123 is continuously off while the head 12 travels the particular distance means that the head 12 does not contact a bump within this particular distance (radial distance). This could mean that the flying height is too much. Therefore, if the HDI sensor 123 is continuously off while the head 12 travels the particular distance in the radial direction of the disk 11, the head heating driver 17 increases the current (or voltage) supplied to the heater element 124 by a particular value.

Consequently, the tip of the slider 125 expands and the flying height of the head 12 decreases by a particular height (the head 12 is lowered).

On the other hand, if the HDI sensor 123 is turned on before the head 12 moves in the radial direction of the disk 11 in block 224, it is determined in block 240 whether or not the bump scanning is completed.

In block 228, it is determined whether or not the flying height is reset to the initial flying height. If the flying height is reset to the initial flying height, the bump flag is reset in block 230, and the bump data is stored in the defect list in the flash memory 24A in block 232. A status for a period from a setting of the bump flag to a resetting of the bump flag is stored as a bump in the defect list.

The data format of the defect list includes, for example, a cylinder number, head number, sector number, and sector length. The cylinder number (cylinder address) indicates a cylinder position of the track 110 on the disk 11 where a bump exists. The head number indicates the recording surface on the disk 11 where the bump exists. If the magnetic disk device is the one including a single disk 11 of which either one disk surface is used as a recording surface, the head number is only optional. If a bump exists to cross over two or more successive data sectors on the tracks 110, the sector number indicates a position of the head data sector, and the sector length indicates the number of data sectors with the bump.

Then, in block 240, it is determined whether or not the bump scanning is completed. If it is determined in block 228 that the flying height is not reset to the initial flying height, blocks 230 and 232 are skipped and it is determined in block 240 whether or not the bump scanning is completed.

Figure 3:
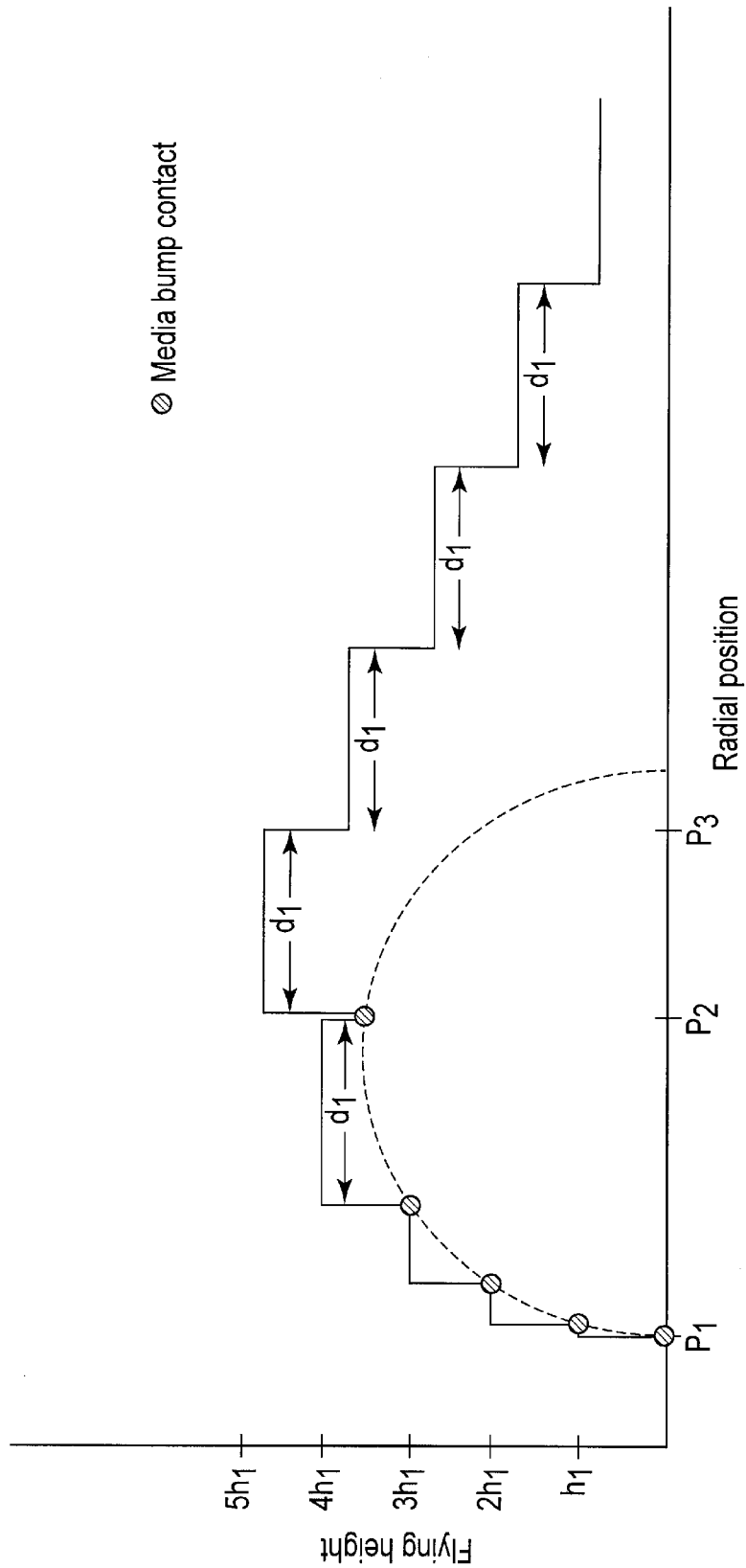
FIG. 3 shows an example of a change of a flying height in the bump scanning.

FIG. 3 shows an example of a change in the flying height during the bump scanning of FIG. 2. FIG. 3 shows a position in the radial direction of the disk 11 along its horizontal axis, a flying height (increments from the initial flying height) along its vertical axis, and a height of a bump by a semicircular broken line. The actual flying height is a sum of a flying height shown in FIG. 3 and the initial flying height.

In blocks 204 and 206 of FIG. 2, a servo pattern is written to tracks from an inward track with the flying height being the initial flying height. When the head 12 seeks outward, the head 12 contacts a bump at position $p_1$, and the HDI sensor 123 is turned on (Yes in block 208). Accordingly, the current supplied from the head heating driver 17 to the heater element 124 decreases and the flying height increases by particular height $h_1$ (block 212 first time). If the head 12 contacts a bump at position $p_1$ for the first time, the bump flag is set (block 216) since the bump flag was reset.

Therefore, it is expected that a contact of the head 12 and the bump will be avoided. However, depending on the shape of the bump, the head 12 will again contact the bump when seeking of the track outward in the radial direction of the disk continues as in FIG. 3. Every time the contact occurs, the flying height increases by particular height $h_1$ (the head 12 is raised) at a time.

If the flying height increases by particular height $h_1$ and a contact of the head 12 and the bump is avoided, the HDI sensor 123 is turned off. If the head 12 sufficiently floats over the bump, the HDI sensor 123 is continuously turned off. As can be understood from radial position $p_2$ in FIG. 3, if the HDI sensor 123 is continuously off while the head 12 travels particular distance $d_1$ (Yes in block 224), the flying height decreases by particular height $h_1$ (block 226) and the head 12 is lowered.

As can be understood from radial position $p_2$ in FIG. 3, when the head 12 is lowered, it would contact the bump again depending on the shape of the bump. If the position (radial position) of the head 12 at which the flying height changes sufficiently passes by the peak of the bump, the head 12 probably does not contact the bump even when it is lowered. However, if the position (radial position) of the head 12 at which the flying height changes is before the peak of the bump, the head 12 probably contacts the bump again when it is lowered. In either case, if the HDI sensor 123 is turned on while the bump flag is set, the flying height increases by particular height $h_1$, and if the HDI sensor 123 is continuously off while the head 12 travels the particular distance, the flying height decreases by particular height $h_1$.

In the example of FIG. 3, $h_1$ is subtracted from $4h_1$ and the flying height decreases at radial position $p_2$; however, the head 12 contacts the bump (media bump contact) in the decrease and the flying height increases by particular height $h_1$ after the contact. Then, once the head 12 passes particular distance $d_1$, the flying height decreases by particular height $h_1$ at each time after passing the radial position $p_3$ and so on. The decrease in the flying height continues until the flying height is reset to the initial flying height (0 in vertical axis of FIG. 3). A single bump is detected during a period between a timing when the HDI sensor 123 is first turned on and then the flying height increases from an initial height and a timing when the flying height is reset to the initial height. The single bump is stored in the defect list.

As explained above, in the bump scanning of FIG. 2, when the head 12 contacts a bump, the head 12 is raised by particular height $h_1$ to avoid a contact with the bump. Then, the bump scanning is performed with the head 12 rising while it travels particular distance d1. If the head 12 does not at all contact a bump while traveling the particular distance, the head 12 is lowered by particular height $h_1$. If the head 12 contacts a bump during or after the descent, the head 12 is raised as above. In this manner, the head 12 is raised or lowered depending on the shape of the bump (especially on the height distribution). Therefore, even if there is a relatively large bump on the magnetic disk 11, the number of collisions of the head 12 with the bump can be reduced and the deterioration and damage to the head 12 can be prevented. Furthermore, a gap between the disk 11 and the head 12 can be set to a minimum, and thus, minute or low bumps can be detected accurately.

Now, bump scanning of another example is exemplified with reference to a flowchart of FIG. 4. In the operation of FIG. 2, a unit of particular height $h_1$ is used to increase/decrease the flying height, but in contrast, this unit is variable in the operation of FIG. 4. Furthermore, in the operation of FIG. 2, a reference distance used to decrease the flying height is particular distance $d_1$, but in contrast, this distance is variable in the operation of FIG. 4. As to the operations of FIGS. 2 and 4, which one is better cannot be determined easily since the performance of bump scanning greatly depends on factors such as shape of bump or the like. As in FIG. 2, bump scanning is performed in a self servo writing process in FIG. 4. Bump scanning of FIG. 4 is outlined in FIG. 6 which shows that, every time the head 12 contacts a bump and the HDI sensor 123 turns on, the head 12 is raised (rising degree gradually decrements), and then the HDI sensor 123 turns off. Then, a distance the head 12 travels while the HDI sensor 123 is continuously off gradually decreases, and the head 12 is lowered by a height inversely corresponding to the distance.

In block 304, seeking is started. In block 306, a servo pattern is written to the servo region 111 of a target track.

In block 308, it is determined whether or not the HDI sensor 123 is turned on, that is, whether or not the head 12 contacts a bump. If the HDI sensor 123 is turned on, it is determined in block 312 whether or not a bump flag is set. If it is determined in block 312 that the bump flag is not set (is reset), the bump flag is set in block 314. Then, in block 316, an initial value is set to a first particular value which is a unit of increment of the flying height.

If it is determined in block 312 that the bump flag is set, a radial distance (on-interval distance) is acquired in block 332, which is a distance the head 12 travels from the previous on-state of the HDI sensor 123 until the current on-state of the HDI sensor 123. Note that, since a distance is proportional to time, what is acquired here may be an on-interval time instead of the on-interval distance. In the bump scanning performed in FIG. 4, the first particular value which is a unit of increment of the flying height is a variable value inversely corresponding to the on-interval distance of the HDI sensor 123. That is, the on-interval distance is equivalent to the frequency of detection of contacts of the head 12 and bumps in the seeking (that is, is equivalent to a reciprocal of the on-interval distance). FIG. 5 shows an example of a relationship between the first particular value and the on-interval distance. If the on-interval distance is less than a particular interval or the frequency is higher than a particular frequency, the first particular value decreases while the interval increases. If the on-interval distance is greater than or equal to the particular interval or the frequency is lower than the particular frequency, the first particular value is a constant value. The initial value set in block 316 is a mean value of the constant value and the maximum value of the first particular value where the on-interval distance is approximately 0. However, the initial value is not limited to a mean value, and may be either the maximum value or the constant value. The first particular value may be acquired by calculating the relationship in FIG. 5 every time bump scanning is performed based on the on-interval distance. In this embodiment, the relationship in FIG. 5 is preliminarily stored in the HDC 22 as a table and the first particular value is read from the table. In block 334, the first particular value corresponding to the on-interval distance acquired in block 332 is read from the table.

As can be understood from the above, the first particular value which is a unit of increment of the flying height is set to an initial value of FIG. 5 when initial turning on of the HDI sensor 123 (block 316), and is set to a variable value after second turning on and thereafter as shown in FIG. 5 (block 334). After blocks 316 and 334, an initial value is set to a second particular value which is a unit of decrement of the flying height in block 318. In block 320, an initial value is set to a particular distance which triggers decrement of the flying height. The particular distance is a reference distance used to determine whether or not the HDI sensor 123 is continuously off, and if off of the HDI sensor 123 continues while the head 12 travels the distance, the flying height decreases.

To raise the head 12 for avoiding a contact of the head 12 with a bump, the flying height increases by the first particular value (head 12 is raised) in block 322. Since the flying height increases based on the first particular value changing as shown in FIG. 5 corresponding to the on-interval of the HDI sensor 123, the number of contacts of the head 12 with bumps (the number of turning on of the HDI sensor 123) can be reduced in the bump scanning. That is, when the on-interval is short, the first particular value which is a unit of increment of the flying height is greater since the flying height of the head 12 should preferably be increased. If the head 12 is raised excessively, minute bumps cannot be detected. Therefore, the first particular value decreases gradually when the on-interval becomes longer. Consequently, when a contact of the head 12 with a bump is detected, the head 12 is raised rapidly and a possible contact with a bump can be avoided effectively. Furthermore, the head 12 is not raised unnecessarily and the detection accuracy can be maintained.

Then, in block 360, it is determined whether or not the bump scanning of all the tracks is completed. If it is not, the process returns to block 304 to continue seeking and the above operation is repeated shifting to a next target track outward in the radial direction of the disk.

In block 308, if it is determined that the HDI sensor 123 is not turned on (is off), it is determined in block 342 whether or not the bump flag is set. If the bump flag is not set (is reset), it is determined in block 360 whether or not the bump scanning is completed. If the bump flag is set, it is determined in block 344 whether or not the HDI sensor 123 is continuously off while the head 12 travels a particular distance in the radial direction of the disk which is a threshold distance. In the initial state, the particular distance is an initial value determined in block 320.

The state where the HDI sensor 123 is continuously off while the head 12 travels the particular distance means that the head 12 does not contact a bump within this particular distance (radial distance). This could mean that the flying height is too much. Therefore, if the HDI sensor 123 is continuously off while the head 12 travels the particular distance in a radial direction of the disk, a second particular value is subtracted from the flying height and the flying height of the head 12 decreases (head 12 is lowered) in block 346.

In block 348, the second particular value which is a unit of decrement of the flying height is doubled. Consequently, a lowering degree of the head 12 in one turn is doubled thereafter in the bump scanning. In block 350, a particular distance relating to the interval of the head lowering is halved. Consequently, a lowering cycle of the head 12 is halved thereafter in the bump scanning. Through the operations in blocks 348 and 350, the head 12 is lowered rapidly and the time necessary to set the flying height to the initial flying height becomes shorter. Note that both operations of block 348 and block 350 are not essential and this advantage can be achieved from either one operation.

In block 352, it is determined whether or not the flying height is reset tot the initial flying height. If the flying height is reset to the initial flying height, the bump flag is set in block 354 and the bump data is stored in a defect list of the flash memory 24A. That is, a single bump is detected during a period between a timing when the bump flag is set and a timing when the bump flag is reset. The single bump is stored in the defect list.

Then, in block 360, it is determined whether or not the bump scanning is completed. If it is determined in block 352 that the flying height is not reset to the initial flying height, blocks 354 and 356 are skipped and it is determined in block 360 whether or not the bump scanning is completed.

Figure 6:
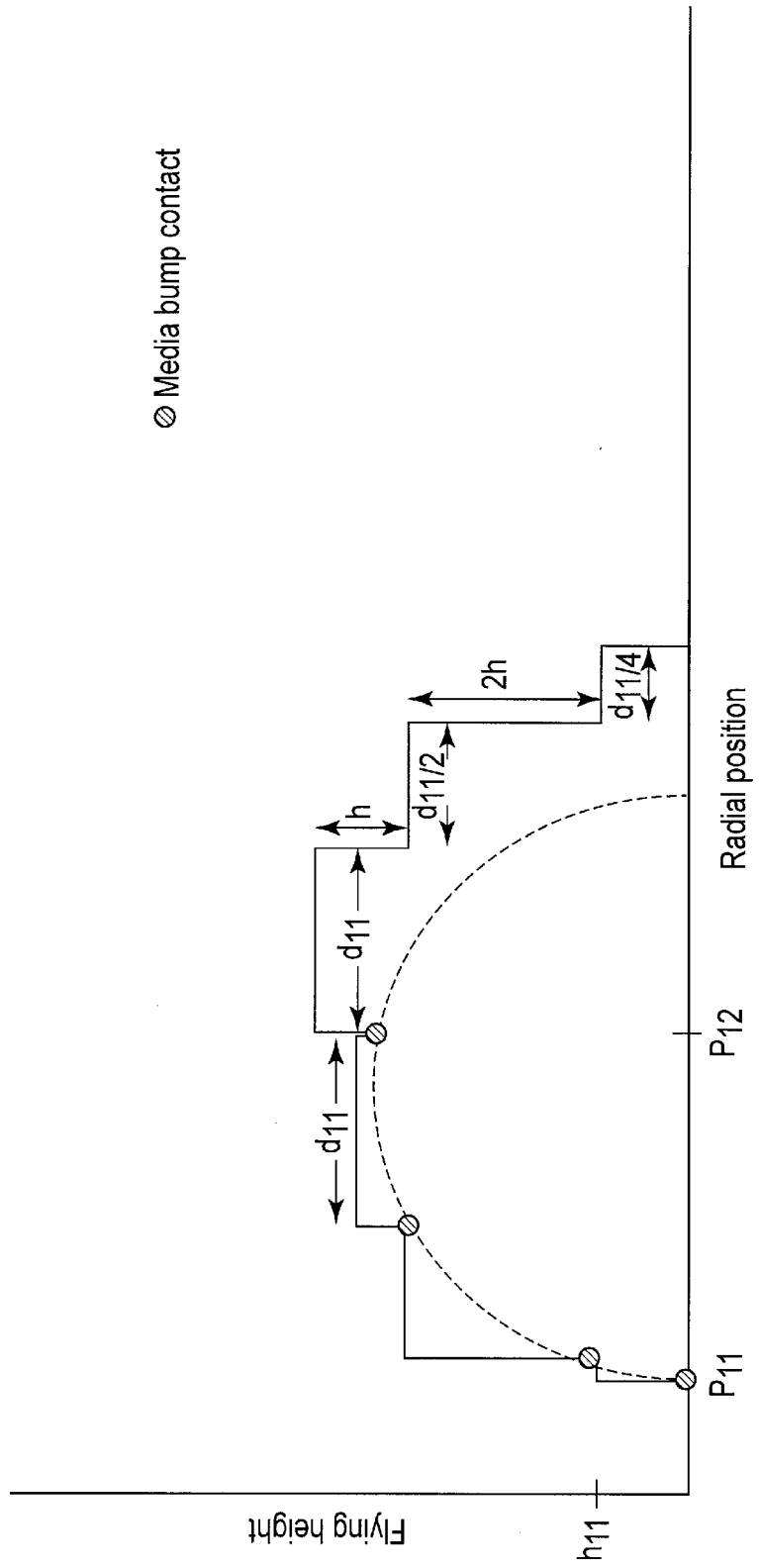
FIG. 6 shows an example of a change of the flying height in the other example of bump scanning.

FIG. 6 shows an example of a change in the flying height during the bump scanning of FIG. 4. FIG. 6 shows a radial position of the disk 11 along its horizontal axis, a flying height (increments from the initial flying height) along its vertical axis, and a height of a bump by a semicircular broken line.

In blocks 304 and 306 of FIG. 4, a servo pattern is written to tracks from an inward track with the flying height being the initial flying height. When the head 12 seeks outward in the radial direction of the disk, the head 12 contacts a bump at position $P_{11}$, the HDI sensor 123 is turned on (Yes in block 308), and the flying height is increased by first particular value $h_{11}$ (block 322 first time). If the head 12 contacts a bump at position $p_{11}$ for the first time, the first particular value is an initial value (block 316). If the head 12 contacts a bump for the second time and thereafter, the first initial value is a variable value shown in FIG. 5 (block 334). If the head 12 contacts a bump at position $p_{11}$ for the first time, the bump flag which was reset before that bump is set (block 314).

Therefore, it is expected that a contact of the head 12 and the bump will be avoided. However, depending on the shape of the bump, the head 12 will again contact the bump when seeking of the track outward in the radial direction of the disk continues as in FIG. 6. Every time the contact occurs, the flying height of the head 12 increases by the first particular value (the head 12 is raised) at a time. As shown in FIG. 5, the first predetermine value is greater when an interval (distance) between the previous turning on and the current turning on of the HDI sensor 123 is shorter, and is smaller when the interval is longer. Therefore, when the HDI sensor 123 is frequently turned on, the increment of the flying height can be set greater, and the frequency of the turning on of the HDI sensor 123 can be reduced. Consequently, the deterioration or destruction of the head 12 caused by contacts with bumps can be prevented.

If the flying height increases sufficiently to avoid a contact of the head 12 and the bump, the HDI sensor 123 is turned off.

If the head 12 sufficiently floats over the bump, the HDI sensor 123 is continuously off. As can be understood from radial position $p_{12}$ in FIG. 6, if the HDI sensor 123 is continuously off while the head 12 travels particular distance $d_{11}$ (Yes in block 344), the flying height decreases by the second particular value (block 346) and the head 12 is lowered.

In the embodiment of FIG. 6, the flying height is decreased at radial position p12; however, the head 12 contacts a bump during the decrease, the flying height is increased after the contact.

Once the flying height decreases, a unit of decrement (second predetermine value) is doubled and a particular distance which is a cycle of decrement is halved. Then, if the HDI sensor 123 is continuously off after the head 12 travels the particular distance, the flying height decreases by the second particular value. The decrease of the flying height continues until the flying height is reset to the initial flying height.

As can be understood from the above, the bump scanning of FIG. 4 can achieve the same advantage obtained by the bump scanning in FIG. 2. In addition, the bump scanning of FIG. 4 increases/decreases the flying height adaptively corresponding to the number of turning on and the on-interval of the HDI sensor 123, and thus, the head 12 is raised/lowered drawing a close profile to the shape of bumps. The number of collisions of the head 12 with bumps can further be reduced and the detection accuracy of bumps can further be improved. For example, if there is a large bump on the disk, the head 12 can be raised rapidly to evade the bump and rapidly return to its initial height after passing by (getting over) the peak of the bump.

In the embodiments described above, the bump scanning is performed in the self servo writing process; however, they are not necessarily performed concurrently and the bump scanning may be performed independently after the writing of the servo patterns. In that case, the entire disk surface needs to be accessed sequentially as in the self servo writing process. Furthermore, a distance the head 12 travels in the self servo writing process is not limited to a half of the servo track width, and may be the same or different width. Furthermore, the self servo writing may be performed starting from outward to inward in a radial direction of the disk.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A head flying height control method comprising:
    moving a head in a radial direction of a disk while the head floats from the disk;
    detecting a contact of the head with the disk by using a contact detecting sensor while the head moves;
    increasing a flying height of the head after detecting the contact of the head with the disk; and
    decreasing the flying height of the head when the contact of the head with the disk is not detected for a certain time.

2. The head flying height control method of claim 1, wherein
    increasing the flying height comprises increasing the flying height by a particular value, and
    decreasing the flying height comprises decreasing the flying height by the particular value.

3. The head flying height control method of claim 1, wherein
    increasing the flying height comprises increasing the flying height by a variable value based on a frequency of contact detection of the head with the disk, and
    the variable value becomes larger when the frequency of contact detection becomes greater and becomes smaller when the frequency of contact detection becomes lower.

4. The head flying height control method of claim 1, wherein
    increasing the flying height comprises increasing the flying height by a variable value based on an interval of a radial distance of the disk, in which the contact of the head with the disk is detected, and
    the variable value becomes larger when the interval becomes shorter and becomes smaller when the interval becomes longer.

5. The head flying height control method of claim 1, wherein
    decreasing the flying height comprises decreasing the flying height by a particular value when the contact of the head with the disk is not detected for a certain time while the head travels a particular distance.

6. The head flying height control method of claim 5, wherein the particular distance becomes shorter as the flying height decreases.

7. The head flying height control method of claim 5, wherein the particular value becomes greater as the flying height decreases.

8. The head flying height control method of claim 1, further comprising:
    writing a servo pattern to the disk, and
    wherein detecting the contact, increasing the flying height, and decreasing the flying height are performed in parallel to writing the servo pattern.

9. The head flying height control method of claim 1, further comprising:
    setting a flag after detecting the contact;
    resetting the flag when the flying height of the head is reset to an initial value; and
    storing a result of detecting the contact of the head with the disk after the flag is reset,
    wherein increasing the flying height of the head is performed only once while the flag is set.

10. A manufacturing method of a disk device comprising a head and a disk, the method comprising:
    moving the head in a radial direction of the disk while the head floats from the disk;
    detecting a contact of the head with the disk by using a contact detecting sensor while the head moves;
    increasing a flying height of the head after detecting the contact of the head with the disk;
    decreasing the flying height of the head when the contact of the head with the disk is not detected for a certain time;
    storing information relating to the flying height in a memory when the contact of the head with the disk is detected; and
    writing data necessary for manufacture of the disk device to the disk based on the information stored in the memory.

11. The manufacturing method of claim 10, wherein
    increasing the flying height comprises increasing the flying height by a particular value, and
    decreasing the flying height comprises decreasing the flying height by the particular value.

12. The manufacturing method of claim 10, wherein
    increasing the flying height comprises increasing the flying height by a variable value based on a frequency of contact detection of the head with the disk, and
    the variable value becomes larger when the frequency of contact detection becomes greater and becomes smaller when the frequency of contact detection becomes lower.

13. The manufacturing method of claim 10, wherein
increasing the flying height comprises increasing the flying height by a variable value based on an interval of a radial distance of the disk, in which the contact of the head with the disk is detected, and
the variable value becomes larger when the interval becomes shorter and becomes smaller when the interval becomes longer.

14. The manufacturing method of claim 10, wherein decreasing the flying height comprises decreasing the flying height by a particular value after the state where the contact of the head with the disk is not detected continues while the head travels a particular distance.

15. The manufacturing method of claim 14, wherein the particular distance becomes shorter as the flying height decreases.

16. The manufacturing method of claim 14, wherein the particular value becomes greater as the flying height decreases.

17. The manufacturing method of claim 10, wherein the necessary data comprises a servo pattern.

18. The manufacturing method of claim 10, further comprising:
setting a flag after detecting the contact;
resetting the flag when the flying height of the head is reset to an initial value; and
storing a result of detecting the contact of the head with the disk after the flag is reset,
wherein increasing the flying height of the head is performed only once while the flag is set.

19. A disk device comprising:
a disk;
a head configured to write necessary data for manufacture of the disk device to the disk;
a contact detecting sensor configured to detect a contact of the head with the disk while the heads moves in a radial direction of the disk; and
a controller configured to control a flying height of the head while writing the data, wherein the flying height of the head is increased if the contact of the head with the disk is detected, and the flying height is decreased if the contact of the head with the disk is not detected for a certain time.

20. The disk device of claim 19, further comprising a memory configured to store a result of detecting the contact of the head with the disk.

* * * * *